United States Patent [19]

Curtis

[11] 3,859,463

[45] Jan. 7, 1975

[54] TELEPHONE ANSWERING SYSTEM AND APPARATUS INCLUDING IMPROVED RING RESPONSIVE CIRCUITRY FOR SELECTIVELY CONNECTING AND ISOLATING THE SYSTEM FROM THE TELEPHONE LINE

[75] Inventor: Lawrence A. Curtis, Garden Grove, Calif.

[73] Assignee: T.A.D. Avanti, inc., Paramount, Calif.

[22] Filed: Apr. 30, 1973

[21] Appl. No.: 355,556

[52] U.S. Cl. .................................................. 179/6 R
[51] Int. Cl. ............................................ H04m 1/64
[58] Field of Search ..................... 179/6 R, 6 E, 6 C

[56] References Cited

UNITED STATES PATENTS

| | | | |
|---|---|---|---|
| 2,815,401 | 12/1957 | O'Dwyer | 179/6 R |
| 3,293,365 | 12/1966 | Mitsui | 179/6 R |
| 3,713,039 | 1/1973 | Hashimoto | 179/6 R |
| 3,723,656 | 3/1973 | Curtis et al | 179/6 E |
| 3,728,488 | 4/1973 | Bonsky et al | 179/6 R |
| 3,757,049 | 9/1973 | Bonsky et al | 179/6 E |

*Primary Examiner*—Raymond F. Cardillo, Jr.
*Assistant Examiner*—David K. Moore
*Attorney, Agent, or Firm*—Jessup & Beecher

[57] ABSTRACT

An improved telephone answering system and apparatus is provided which includes circuitry for sensing telephone rings, and which in response thereto seizes and holds the telephone line, and which in its standby state is fully isolated from the telephone line from a direct current standpoint. The system and apparatus of the invention responds to the ring signal to seize the telephone line, normally for a first time interval $T_1$ while an announcement is transmitted over the line to the calling party, and then for a time interval $T_2$ to permit the calling party to record his message. The system and apparatus of the invention responds to changes in voltage or current on the telephone line, indicating that the calling party has hung up, to return the system to its standby condition, in which it is again disconnected from the telephone line. The system and apparatus of the invention has a feature in that it is unresponsive to subsequent calls during the $T_1$ interval, even though the original calling party has hung up.

4 Claims, 4 Drawing Figures

TELEPHONE ANSWERING SYSTEM AND APPARATUS INCLUDING IMPROVED RING RESPONSIVE CIRCUITRY FOR SELECTIVELY CONNECTING AND ISOLATING THE SYSTEM FROM THE TELEPHONE LINE

RELATED PATENT APPLICATIONS

Ser. No. 250,888, filed May 8, 1972 — Telephone Answering System, now issued as U.S. Pat. No. 3,728,488 on Apr. 17, 1973.

Ser. No. 184,702 filed Sept. 29, 1971 — Adapter Unit for Telephone Answering Instrument, now issued as U.S. Pat. No. 3,729,589 on Apr. 24, 1973.

Ser. No. 189,268 filed Oct. 14, 1971 — Telephone Answering Instrument and System, now abandoned.

Ser. No. 52,636 filed July 6, 1970 — Telephone Answering Instrument and System (now abandoned).

BACKGROUND OF THE INVENTION

A telephone answering system and apparatus is described and claimed, for example, in copending application Ser. No. 52,636 which was filed July 6, 1970 (now abandoned). The telephone answering system and apparatus described in the copending application is of the general type which includes a sensing circuit that responds to a ring signal on the telephone line to activate the answering instrument. Upon the receipt of the ring signal, the instrument is energized, and a recorded message is transmitted over the telephone line to the calling party. Subsequently, a message recording tape is activated within the answering instrument, in order that the calling party may record his message.

In the system described in the copending application Ser. No. 52,636, (now abandoned), a situation could arise whereby the calling party may hang up during the transmission of the message to him by the system. Then when the system is ready to receive the message, a dial tone may occur on the telephone line. Unless additional control circuitry is incorporated, the instrument will record the dial tone and continue to do so until the end of its storage capability is reached. This means that the instrument is connected to the telephone line for a relatively long interval of time, and is disabled from receiving any further messages. It also means that the major part of its storage has been used to record a useless tone signal.

The U.S. Pat. No. 3,729,589 describes an extremely simple adapter unit which is intended to be interposed between the telephone answering system and apparatus described in the original application and the telephone line. The adapter unit of the latter application serves as an isolating means for the answering system and apparatus, and it responds to the hang up of the calling party to disconnect the telephone answering device from the telephone line. This means that should the calling party hang up at any time, instead of the instrument remaining coupled to the line and constituting a load on the line, the adapter unit of the copending application responds to the hang up to disconnect the telephone answering device and to isolate it from the telephone line. At that time, since there is no signal input to the telephone answering system, it will automatically turn itself off.

The system described in U.S. Pat. No. 3,729,589 constitutes an improvement over the adapter unit described in the aforesaid copending application Ser. No. 184,702, and it provides a solid state switching circuitry which is incorporated directly into the telephone answering system and apparatus. The circuitry is such that in its standby condition the system is disconnected from the telephone line and completely isolated from the line, except for a ring sensing circuit which is capacitively coupled thereto. When an alternating current ring signal appears on the line, this signal is sensed, and the solid state switching circuitry of the system then connects the system to the telephone line, so that the system may then undergo its normal operations in successive time intervals $T_1$ and $T_2$.

The circuitry described in U.S. Pat. No. 3,728,488 is such that should a malfunction occur in the device during the time interval $T_1$, such as tape breakage, which would otherwise prevent the unit from completing its normal cycle, a timing circuit takes over to disconnect the instrument from the telephone line after a predetermined time interval corresponding, for example, to slightly longer than $T_1$. There is also solid state switching circuitry included in the unit of the U.S. Pat. No. 3,729,589 that responds to any change in voltage or current on the telephone line, indicating that the calling party has hung up, or sensing the presence or discontinuance of a tone signal or busy signal on the telephone line, to disconnect the unit from the line and return it to its standby state.

DETAILED DESCRIPTION OF THE ILLUSTRATED EMBODIMENTS

Figure 1:
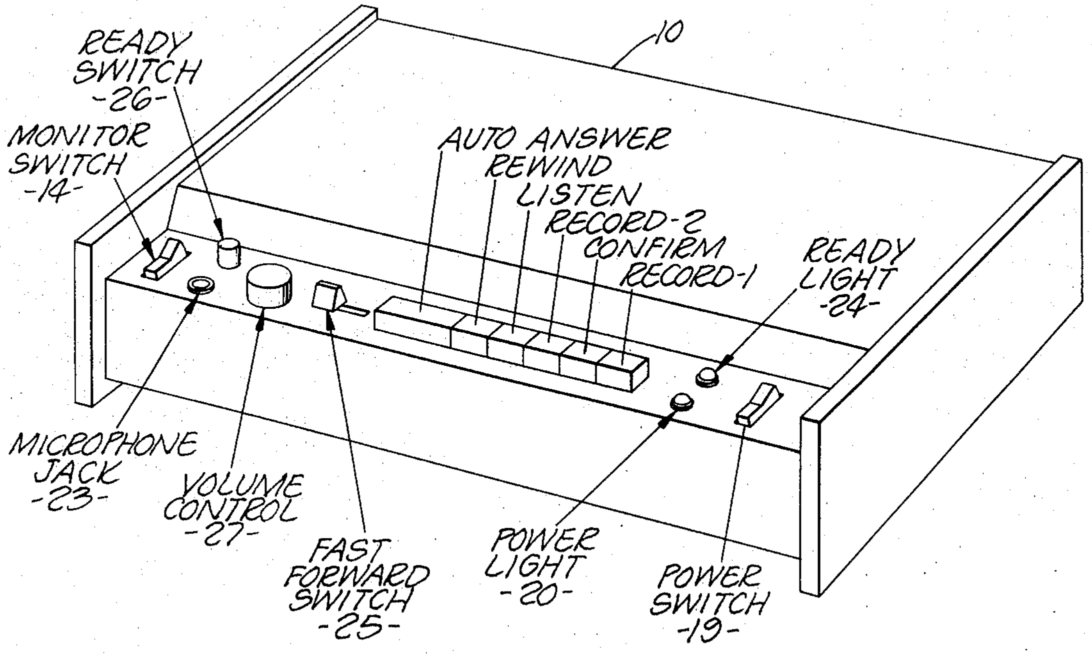
FIG. 1 is a perspective representation of a telephone answering instrument in which the control circuitry of the present invention may be incorporated.

The telephone answering unit shown in FIG. 1 is of the type which is used directly with the telephone line, and which may be plugged into a usual telephone jack. The apparatus, as described in the U.S. Pat. No. 3,729,589, has the feature in that it operates independently of the telephone instrument, and does not require that the telephone instrument be placed on top of its housing, as is the case with most prior art units. The particular unit shown in FIG. 1 shows a housing 10 for the electronic control and switching circuitry, and the housing includes a control panel. A series of push button switches are mounted on the control panel, and these are designated "auto answer," "rewind," "listen," "confirm," "record 1," and "record 2." A thumb operated "on-off" power switch 18 is also located on the control panel. In addition, indicator lights such as the light 20 indicating "power" and the light 24 indicating "ready" are mounted on the control panel. Also mounted on the front panel are a volume control 27, a monitor switch 19, a fast forward switch 25, a ready switch 26, and a microphone jack 23.

The telephone answering system is equipped with a loop announcement tape on which an announcement is recorded, so that at any time a telephone ring signal is received, the announcement is automatically made to the caller. The instrument also includes a message tape on which the incoming calls are recorded. Upon the receipt of a call, and during the first time interval $T_1$, the announcement recorded on the announcement tape is transmitted to the calling party. Then, the system enters its $T_2$ time interval during which the calling party may record his message on the message tape.

In order to clarify the description of the present invention, only those portions of the circuit of FIGS. 2A, 2B, 2C which involve the system of the present invention will be described. The other portions of the circuit of FIG. 2 are similar to those described in the copending applications, and perform the other functions of the telephone answering device such as described in detail therein.

Figure 2A:
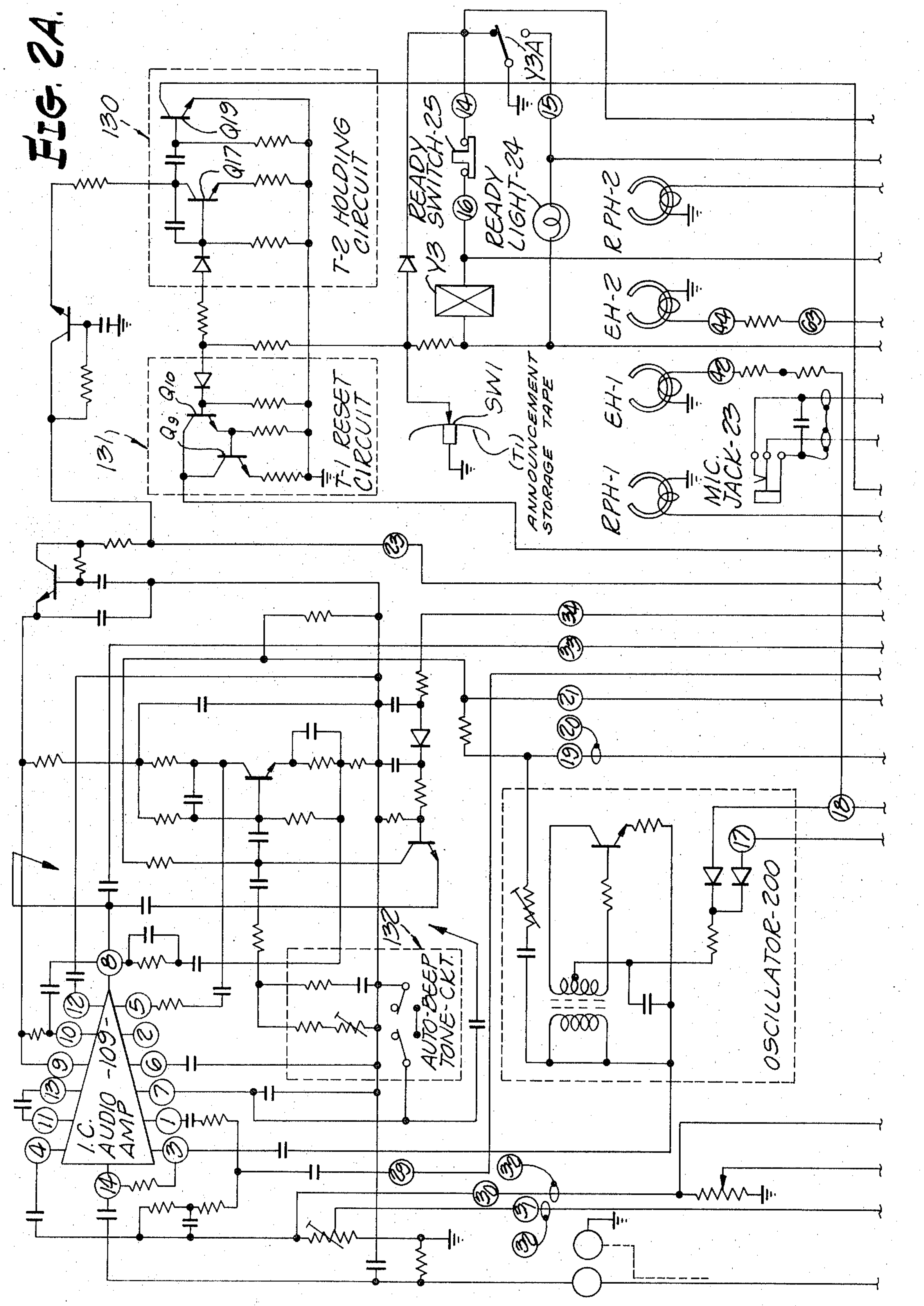
FIGS. 2A, 2B and 2C are diagrams showing in circuit detail the electronic system which may be incorporated into the instrument of FIG. 1, and which includes the solid state switching circuitry and timing circuitry of the present invention.
Figure 2B:
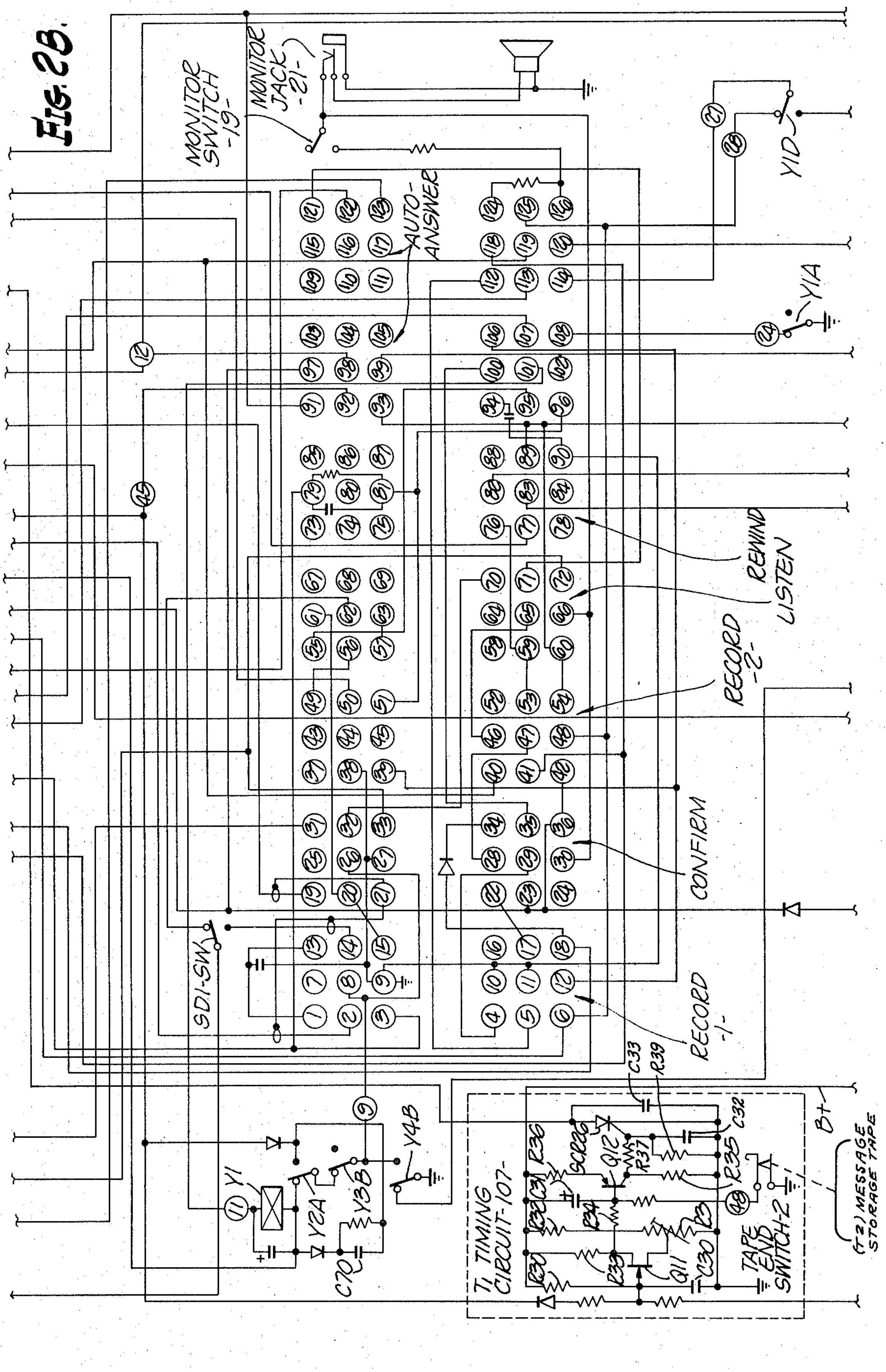
Figure 2C:
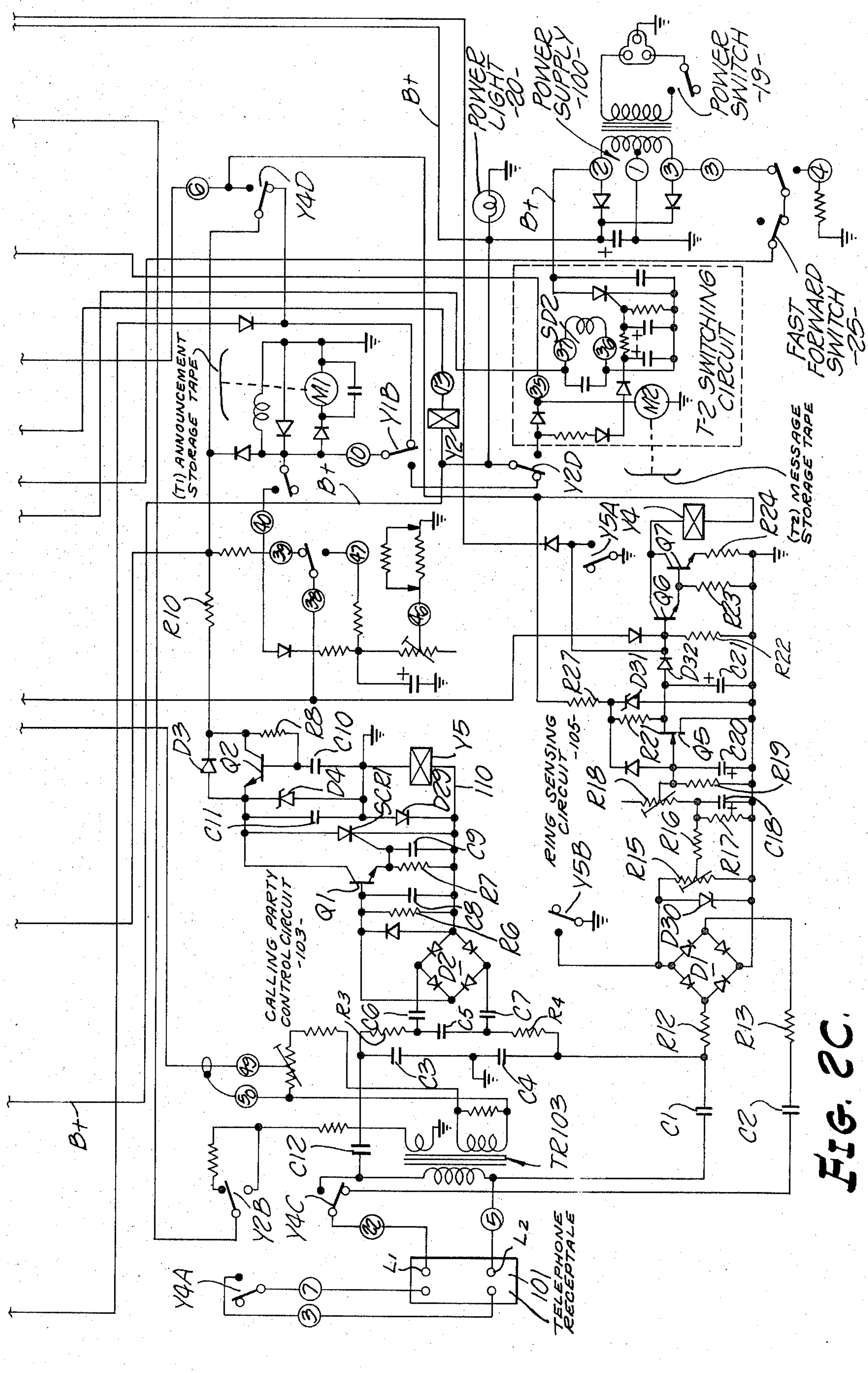

As shown in FIG. 2C, for example, the circuit includes a pair of input terminals L1 and L2 which are connected to a usual telephone receptacle 101.

The push button switches described in conjunction with FIG. 1 are six-pole double-throw switches as shown in FIG. 2B. For example, when the Record 1 push button switch is not actuated, its common terminals 2, 8 and 14 connect respectively with the upper terminals 1, 7 and 13, and its lower terminals 5, 11 and 17 connect respectively with its upper terminals 4, 10 and 16. However, when the push button switch is actuated, its common terminals 2, 8 and 14 connect respectively with its lower terminals 3, 9 and 15, whereas its common terminals 5, 11 and 17 connect respectively with its lower terminals 6, 12 and 18. This also applies to the confirm push button switch, the Record 2 push button switch, and the Auto Answer push button switch, the latter being a dual type.

As a preliminary setting for the system, the Auto Answer push button switch is depressed, and the system is in its standby mode awaiting an incoming ring to set it in operation. For the actuated position of the auto answer switch, and when the power switch 18 is on, the power supply 100 in FIG. 2C is energized, so that a positive direct voltage is applied to the lead designated B+. This positive voltage causes the power light 20 to be energized. The ready light 24 is also on.

The system is now in its standby condition. The relay contacts Y4C are open, insofar as the transformer TR103 is concerned, and the system is disconnected from the telephone line, insofar as direct currents are concerned, so that no direct current load is placed on the line by the circuit. The relay contacts Y4C connect a pair of capacitors C1 and C2 to the terminals L1, L2, so that a ring sensing circuit 105 may be capacitively coupled to the line during the standby condition.

Now, should a ring signal be received on the telephone line, the signal is introduced by way of the input terminals L1 and L2 to the ring sensing circuit 105. The ring sensing circuit includes a diode bridge rectifier D1 which is connected through appropriate circuitry to a relay Y4. The relay Y4 becomes energized in response to the incoming ring signal, and it closes its contacts Y4A so that a busy signal may be generated over the telephone line by way of receptacle 101, and it also closes its contacts Y4C to connect the primary of the transformer TR103 to the telephone line. The terminal connection L1 and L2, as well as the relay contact connections Y4A to the receptacle 101 may be made by a usual plug, which plugs into the receptacle. When the relay contacts Y4A are closed, a conventional circuit is established over the telephone line which prevents other calls from being accepted by the system, and which causes a busy tone to be generated on the line, in accordance with usual telephone practice. The relay Y4 closes its contacts Y4B to energize the relay Y1. The relay Y1 then closes its contacts Y1B to energize the motor M1 and thereby drive the announcement tape.

The announcement on the announcement tape is sensed by a record head RPH1 (FIG. 2A) and is passed through a closed switch SD1-SW (FIG. 2B) contact to an integrated circuit audio amplifier 109 (FIG. 2A). The amplified signal from the audio amplifier 109 is applied to the upper right hand winding of the transformer TR103, and is coupled through the transformer to the phone line by way of the terminals L1 and L2.

The system is now in its $T_1$ time interval mode, during which the announcement recorded on the announcement tape T1 is transmitted over the phone line. At the end of this interval $T_1$, the system is automatically switched to its second mode as a $T_1$ shut-off switch SW1 (FIG. 2A) associated with the announcement tape completes a circuit to the relay Y2 to energize that relay. The relay Y1 is de-energized at the end of the $T_1$ time interval, however the relay Y4 remains energized. When the relay Y2 is energized, the relay contacts Y2D switch the power from the announcement tape drive motor M1 (FIG. 2C) to the message tape drive motor M2 (FIG. 2C). The announcement tape is now stopped, and the message tape begins to move.

However, should a malfunction occur during the time interval $T_1$, so that the system does not answer its normal $T_2$ mode, a timing circuit 107 (FIG. 2B) operates to energize a relay Y3 (FIG. 2A). When the relay Y3 is energized, the contacts Y3B open to de-energize the relay Y1, and thereby to set the system to an off mode in which its transformer TR103 is disconnected from the telephone line and in which it no longer responds to the ring signal.

Specifically, at the end of the announcement, the contact switch SW1 is grounded through a hole in the $T_1$ announcement tape. This causes a transistor Q17 in a $T_2$ holding circuit 130 (FIG. 2A) to become nonconductive to render the transistor Q19 conductive which energizes the relay Y2. This opens the relay contacts Y2A and de-energizes the relay Y1 after capacitor C70 (FIG. 2B) is discharged. At this time, the relay contacts Y1C and Y2C in an automatic beep tone circuit 132 remain closed until the capacitor C70 discharges to produce a partime feedback in the audio amplifier so as to transmit a beep tone for the calling party on the telephone line for a brief time at the beginning of $T_2$.

If the system is operating normally, it enters its $T_2$ mode, and is now ready to record messages from the calling party. The incoming signals are now applied through the transformer TR103 to its lower right hand winding and through the switch SD1-SW contacts to the audio amplifier 109. The amplified signals from the amplifier are then recorded on the message tape by a recording head designated RPH2 (FIG. 2A).

If at any time $T_1$ or $T_2$, the calling party hangs up, or some other transition occurs on the telephone line, such as the commencement or termination of a busy signal, or the commencement or termination of a dial tone, the resulting change in line voltage or current, is sensed by a diode rectifier D2 in the calling party control circuit 103 (FIG. 2C), and the resulting output fires a silicon controlled rectifier SCR1 to energize a relay Y5. As will be described, the calling party control circuit 103 is directly coupled to the primary of transformer TR103 for maximum sensitivity. The relay Y5 remains energized for the duration of the time interval $T_1$, after which the silicon control rectifier SCR1 is reset and the relay Y5 is de-energized. When the relay Y5 is energized, its relay contacts Y5A close, placing a ground on the holding circuit for the relay Y4, so that the relay Y4 is de-energized, and the circuit is returned to its standby mode in which it is isolated from the telephone line. Also, the relay contacts Y5B short out the ring sensing circuit for the duration of $T_1$, so that no further calls can be accepted.

That is, when the caller hangs up, a pulse voltage appears on the telephone line and is coupled directly through the capacitors C12, C6, C7 to the diode bridge rectifier D2 in the calling party control circuit 103 (FIG. 2C) and appears at the base of the transistor Q1. The resulting emitter voltage of Q1 triggers the silicon controlled rectifier SCR1 to energize the relay Y5. Relay contacts Y5A now close to ground the base of the transistor Q6 to render Q7 non-conductive and de-energize the relay Y4. This causes the unit to stop, and to be disconnected from the phone line as the contacts Y4C open. Also the busy signal is removed from the telephone line as the contacts Y4A open.

The above-described telephone answering system and apparatus is one which in its standby mode is isolated from the telephone line and produces no direct current load on the line. In response to a ring signal on the telephone line, the answering system seizes the line, and automatically enters its announcement mode. The announcement is transmitted over the line, and the instrument then enters its $T_2$ mode, in which it responds and records any message from the calling party. The system is constructed so that any transition in the telephone line voltage or current, indicating that the calling party has hung up, or that some other transition has occurred, causes the system to automatically return to its standby mode, in which it is isolated from the telephone line.

The system also includes a timing circuit 107 (FIG. 2B), so that should a malfunction such as tape breakage occur in the system during the $T_1$ interval, the system will still disconnect itself from the telephone line after a predetermined interval, so that it does not remain coupled to the line during prolonged periods, even though a malfunction might have occurred. For example, the timing circuit will turn the unit off if the $T_1$ interval lasts more than 25 seconds. At the end of the $T_1$ interval, and when the SW1 switch on the announcement tape closes, transistors Q9 and Q10 in a T-1 reset circuit 131 (FIG. 2A) discharge the capacitor C30 in the $T_1$ timing circuit 107 (FIG. 2B) to reset the timing circuit.

In addition, when the system arrives at the end of the message tape, a tape-end switch SW2 (FIG. 2B) closes which energizes the relay Y3 to place the system in the aforesaid off mode, in which it is disconnected from the phone line. The relay Y3 remains energized so long as the switch SW2 is closed, indicating that no further messages can be recorded on the message tape. It is to be noted that the system is no longer capable of responding to the ring signal and, as such, it is maintained in a disconnected condition, insofar as the telephone line is concerned. Therefore, incoming calls on the telephone line proceed as normal, with the phone ringing. However, the system is now disconnected from the telephone line, and remains in such a condition until the message tape is again returned to its origin position. It is to be noted that when the message tape is full, the system does not permanently hold the line, but removes itself completely from the telephone line, and, to all intents and purposes, is not present.

The primary of the transformer TR103 (FIG. 2C) is coupled to the calling party control circuit 103 through a coupling capacitor C12 having a capacity of 0.1 microfarads. This capacitor, in turn, is connected to a grounded capacitor C3 having a capacity of 0.0047 microfarads. The other side of the primary winding of the transformer TR103 is coupled through a capacitor C1 having a capacity of 0.47 microfarads to a grounded capacitor C4. The latter capacitor has a capacity of 0.0047 microfarads. The capacitors C3 and C4 are bridged by a pair of 10 kilo-ohm resistors R3 and R4 which are intercoupled by a 0.0033 microfarad capacitor C5. This coupling of the calling party control circuit to the primary of transformer 103 provides a highly sensitive circuit which responds quickly to changes in line signal level to control the system.

The resistor R3 is connected to one side of the diode bridge D2 through a 0.01 microfarad capacitor C6, and the resistor R4 is connected to the other side of diode bridge D2 through a 0.01 microfarad capacitor C7. The diode bridge D2 is connected to the base of a transistor Q1 in the input/output circuit 103, the base of the transistor being connected to a 47 kilo-ohm resistor R6 which is shunted by a 0.001 microfarad capacitor C8, the resistor and capacitor being connected to a common lead 110 extending from the bridge D2.

The emitter of the transistor Q1 is connected to a 1 kilo-ohm resistor R7 which is shunted by a 0.0047 microfarad capacitor C9, the emitter being connected to the control electrode of a silicon controlled rectifier SCR1. The resistor R7, the capacitor C9 and the cathode of SCR1 are all connected to the lead 110. The collector of the transistor Q1 is connected to the anode of the silicon controlled rectifier SCR1, and to the emitter of an NPN transistor Q2. The base of the transistor Q2 is connected to a 33 microfarad capacitor C10 which is grounded. The emitter of the transistor Q2 is also connected to a grounded Zener diode D4, and to a grounded 47 microfarad capacitor C11. A 4.7 kilo-ohm resistor R8 is connected between the base and collector of the transistor Q2. A diode D3 is shunted across the collector and emitter of the transistor Q2.

The lead 110 is connected to one side of the relay Y5, the other side of which is grounded. The relay is shunted by a diode D29. The collector of the transistor Q2 is also connected through a 56 ohm resistor R10 to the relay contact Y4D. The capacitors C1 and C2 each has a value of 0.47 microfarads. The capacitor C1 is connected through a 47 kilo-ohm resistor R12 to one side of the diode bridge D1, and the capacitor C2 is connected through a 47 kilo-ohm resistor R14 to the other side of the diode bridge D1. The diode bridge is also connected to a normally open contact Y5B of the relay Y5, the armature of which is grounded. The diode D3 establishes a circuit to the silicon control rectifier SCR1 to maintain the silicon controlled rectifier conductive and the relay Y5 energized for the duration of the outgoing announcement interval ($T_1$) even though the calling party hangs up during the interval ($T_1$). Also, the relay contacts Y5B will ground out any incoming ring signals during the ($T_1$) interval. These elements effectively de-activate the ring sensing circuit whenever the announcement storage tape is activated, that is, whenever M1 is energized.

The ring sensing circuit 105 includes a Zener diode D30 shunted across the bridge and a 50 kilo-ohm potentiometer R15. The potentiometer R15 is connected to a grounded 47 kilo-ohm resistor R17 and to a grounded 1 microfarad capacitor C18. The resistor R17 and capacitor C18 are connected to a variable 100 kilo-ohm resistor R18 which, in turn, is connected to the gate electrode of a field effect transistor Q5 and to a grounded 1 megohm resistor R19. The gate electrode is also connected to a grounded 100 microfarad capacitor C20. The source electrode of the field effect transistor is grounded, and the drain electrode is connected to the B+ lead through a 2.2 kilo-ohm resistor R20. The drain electrode of the field effect transistor Q5 is connected through a 27 kilo-ohm resistor R21 to the resistor R20, the junction of the resistors R20 and R21 being connected to a grounded Zener diode D31.

The drain electrode of the field effect transistor Q5 is also connected to a grounded 100 microfarad capacitor C21 and through a diode D32 to the base of an NPN transistor Q6. The base of the transistor Q6 is connected to a grounded 33 kilo-ohm resistor R22. The emitter of the transistor Q6 is connected to the base of an NPN transistor Q7. The collector of the transistor Q7 is connected to the collector of the transistor Q6 and to the relay Y4. The emitter of the transistor Q6 is connected to a grounded 1 kilo-ohm resistor R23, and the emitter of the transistor Q7 is connected to a grounded 2.2 ohm resistor R24.

The T1 timing circuit 107 (FIG. 2B) includes a 1 megohm resistor R30 which is connected to the gate electrode of a field effect transistor Q11. The gate electrode is also connected to a grounded 100 microfarad capacitor C30. The source electrode of the transistor Q11 is connected to a 5 kilo-ohm potentiometer R31. The potentiometer is also connected to the B+ lead of the power supply 100 through a 4.7 kilo-ohm resistor R32. The drain electrode of the transistor Q11 is connected to the B+ lead through a 3.3 kilo-ohm resistor R33. The source electrode is also connected through a 47 kilo-ohm resistor R34 to the base of a PNP transistor Q12.

The collector of the transistor Q12 is connected to a grounded 10 kilo-ohm resistor R35 and through a resistor R37 to the gate electrode of a silicon controlled rectifier SCR6. The anode of the silicon controlled rectifier SCR6 is connected to the relay Y3, and its cathode is connected ground. The silicon controlled rectifier is shunted by a 0.01 microfarad capacitor C33. The emitter of the transistor Q12 is connected through a 100 ohm resistor R36 to the B+ lead, and the base electrode of the transistor Q12 is connected through a 100 microfarad capacitor C31 to that lead. The gate electrode of the silicon controlled rectifier SDR6 is connected through a 3.3 microfarad capacitor C32 to the grounded cathode. The capacitor C32 is shunted by a resistor R39.

As mentioned above, if a malfunction occurs during the $T_1$ interval, the timing circuit 107 will automatically shut the unit off if the $T_1$ interval persists, for example, longer than 25 seconds. When the relay Y1 is energized during $T_1$ the contacts Y1B close to energize the announcement tape drive motor M1. As long as these contacts are closed, a charge builds up across the capacitor C30 connected to the gate of FET Q11 in the timer circuit. After a time interval of, for example, 25 seconds, the FET turns on the transistor Q12 to fire SCR6. This energizes the relay Y3 and that relay is held energized through its hold contact Y3A. Relay Y4 is now de-energized and the unit stops and will not respond to any further calls until Y3 is released.

The circuit of FIG. 2A also includes an oscillator 200 which supplies a bias signal to the record heads RPH1 and RPH2. A microphone may be plugged into the microphone jack 23 (FIG. 2A) for recording signals on the announcement tape. The remaining circuitry of FIG. 2A is similar to that described in the copending application Ser. No. 250,888 referred to above, and will not be described in further detail herein.

The coupling of the calling party control circuit 103 to the primary of the transformer TR103 results in maximum sensitivity of that circuit. The inclusion of the diode D3 and relay contacts Y5B in the system act to prevent the system from accepting any incoming call during the ($T_1$) announcement transmission interval, even through a previous calling party has hung up during that interval.

While a particular embodiment of the invention has been shown and described, modifications may be made, and it is intended in the following claims to cover all modifications which fall within the spirit and scope of the invention.

What is claimed is:

1. In a telephone answering system for responding to telephone messages received over a telephone line and which comprises an announcement storage means and a message storage means and respective associated transducers, and which further comprises first and second means for driving said announcement storage means and said message storage means respectively relative to said transducers for producing a recorded announcement on the telephone line from the announcement storage means during a first time interval in response to an incoming telephone call from a calling party, and for subsequently recording a message from the calling party on said message storage means during a second time interval, and which further includes first control circuit means for activating said announcement storage driving means in response to said incoming telephone call to produce said recorded announcement for transmission over the telephone line to the calling party during the first time interval, second control circuit means coupled to said announcement storage means for activating said message storage driving means at the termination of the announcement so as to initiate the recording of the aforesaid message from the calling party on the message storage means, a transformer having a first, a second and a third winding, and an audio-amplifier having its output connected to the second transformer winding and its input connected to the third transformer winding, means controllably coupling the input of the audio-amplifier to said announcement storage means for introducing the announcement thereon to the telephone line during said first time interval, and means controllably coupling the output of the audio-amplifier to said message storage means for introducing the message received over the telephone line from the calling party to said message storage means during the second time interval; the combination of a ring signal sensing circuit, a relay having normally-open contacts and normally-closed contacts, and further having an energizing coil connected to said ring signal sensing circuit to be actuated thereby to close the normally-open contacts thereof and connect said first winding of said transformer to the telephone line in response to a ring signal received over the line and introduced to said ring sensing circuit, capacitive means coupling said ring sensing circuit through the normally-closed contacts of said relay to the telephone line and presenting relatively low impedance to said ring signal to pass said ring signal to said ring sensing circuit so as to cause said ring sensing circuit to actuate said relay in response to said ring signal; third control circuit means responsive to a change in signal level on the telephone line for controlling said relay to open said normally-open contacts thereof and disconnect said first winding of said transformer from the telephone line and thereby isolate said audioamplifier from the telephone line should communication with the calling party be interrupted during the first or second time interval; capacitive means directly coupling said third control circuit means to said first winding of said transformer and to said normally-open contacts of said relay; and circuit means connected to said first control circuit means and to said third control circuit means to deactivate said ring sensing circuit for the duration of said first time interval whenever said third control circuit means is activated during said first time interval.

2. The combination defined in claim 1, and which includes circuitry for automatically de-activating said first control circuit means and activating said second control circuit means at the end of said first time interval.

3. The combination defined in claim 1, and which includes circuitry including contact means connected to said message storage means and to said relay switch to cause said normally-open contacts thereof to open when said message storage means becomes full.

4. The combination defined in claim 1, and which includes a timing circuit for de-activating said message storage means after a predetermined time interval.

* * * * *